Oct. 24, 1950  M. H. ROSKE  2,526,691
MACHINE FOR AND METHOD OF FOLDING
Filed Sept. 7, 1949  8 Sheets-Sheet 4

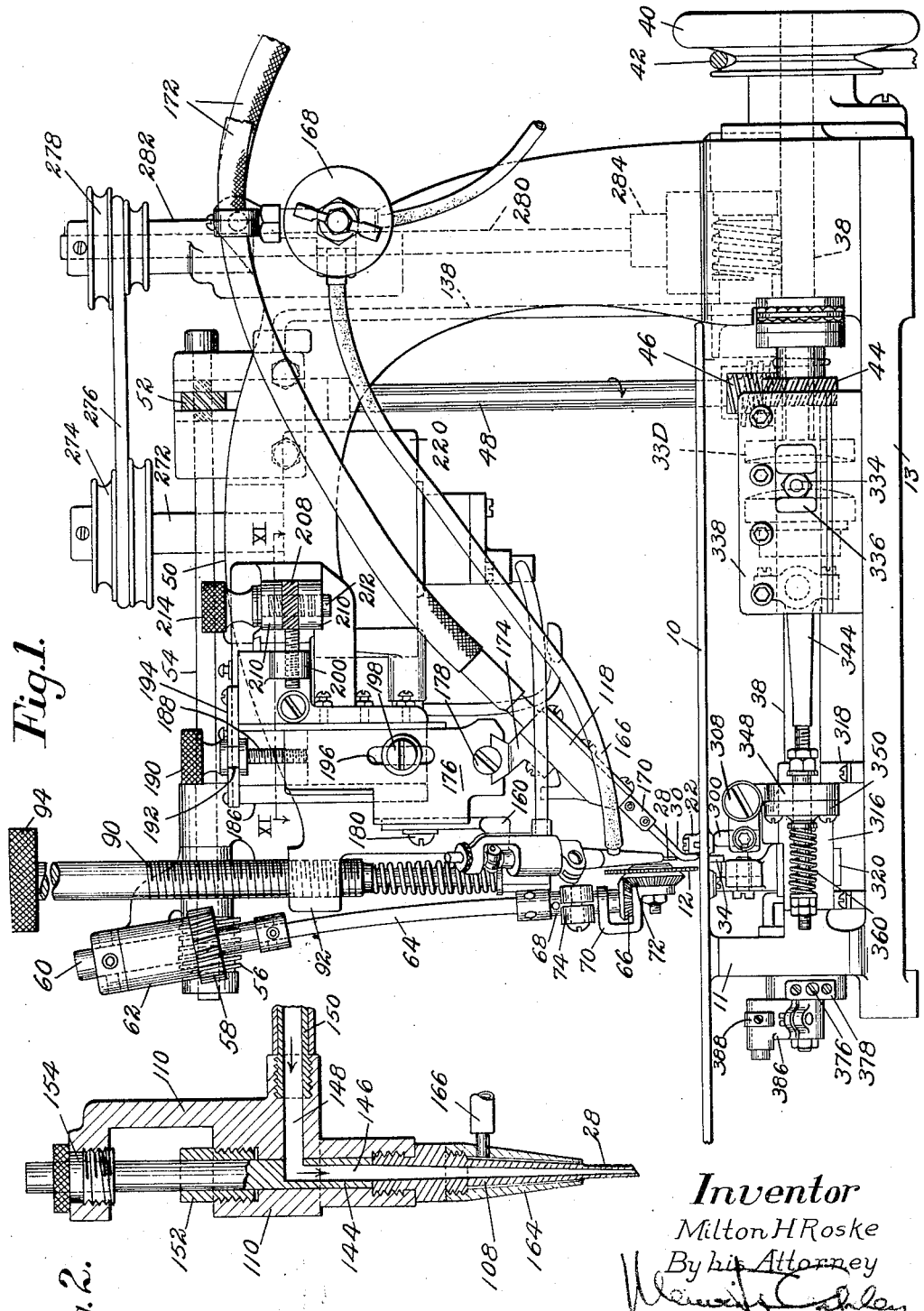

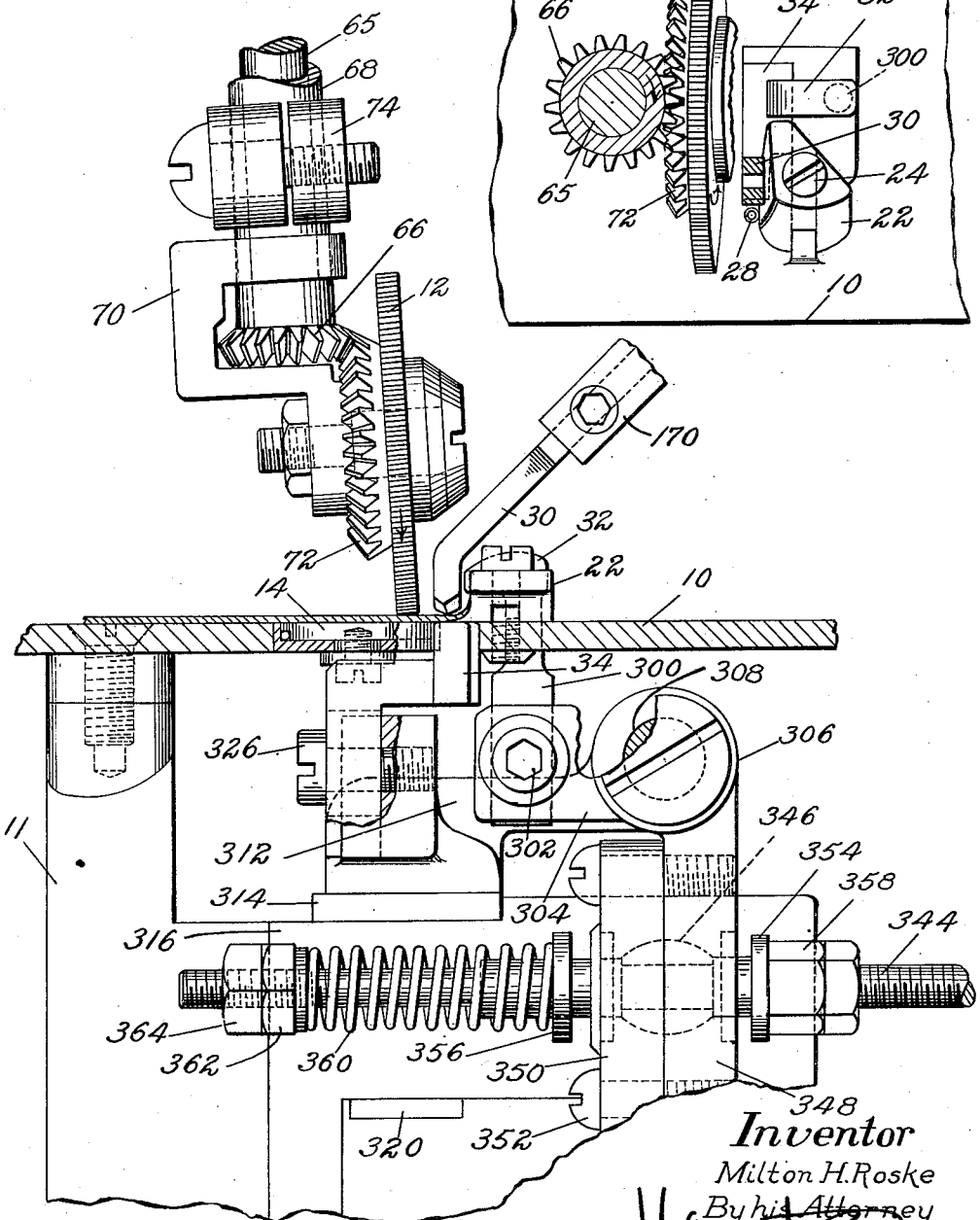

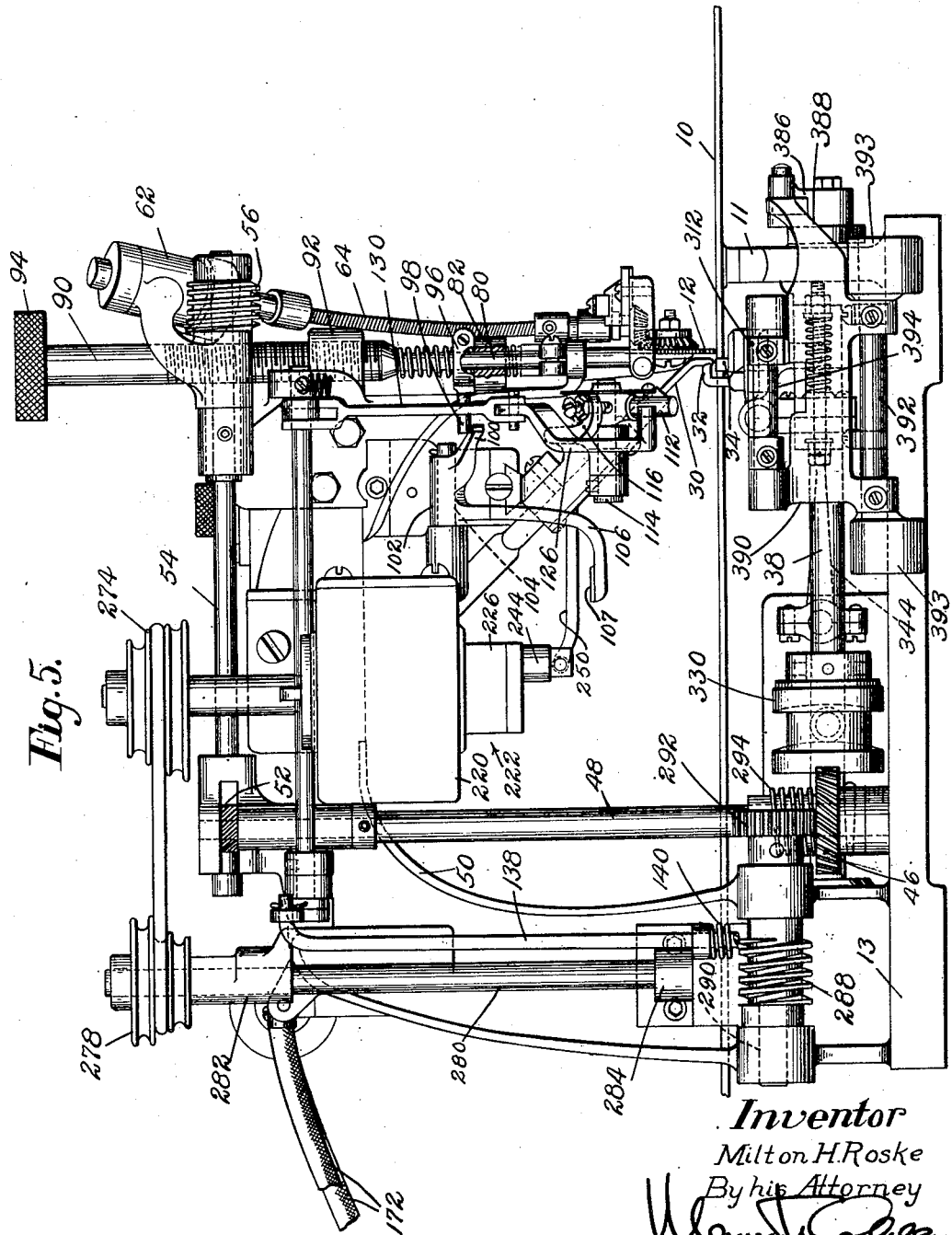

Inventor
Milton H. Roske
By his Attorney

Oct. 24, 1950  M. H. ROSKE  2,526,691
MACHINE FOR AND METHOD OF FOLDING
Filed Sept. 7, 1949  8 Sheets-Sheet 5

Inventor
Milton H. Roske
By his Attorney

Oct. 24, 1950 M. H. ROSKE 2,526,691
MACHINE FOR AND METHOD OF FOLDING
Filed Sept. 7, 1949 8 Sheets-Sheet 6
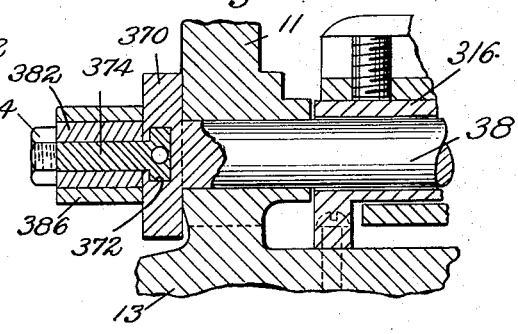
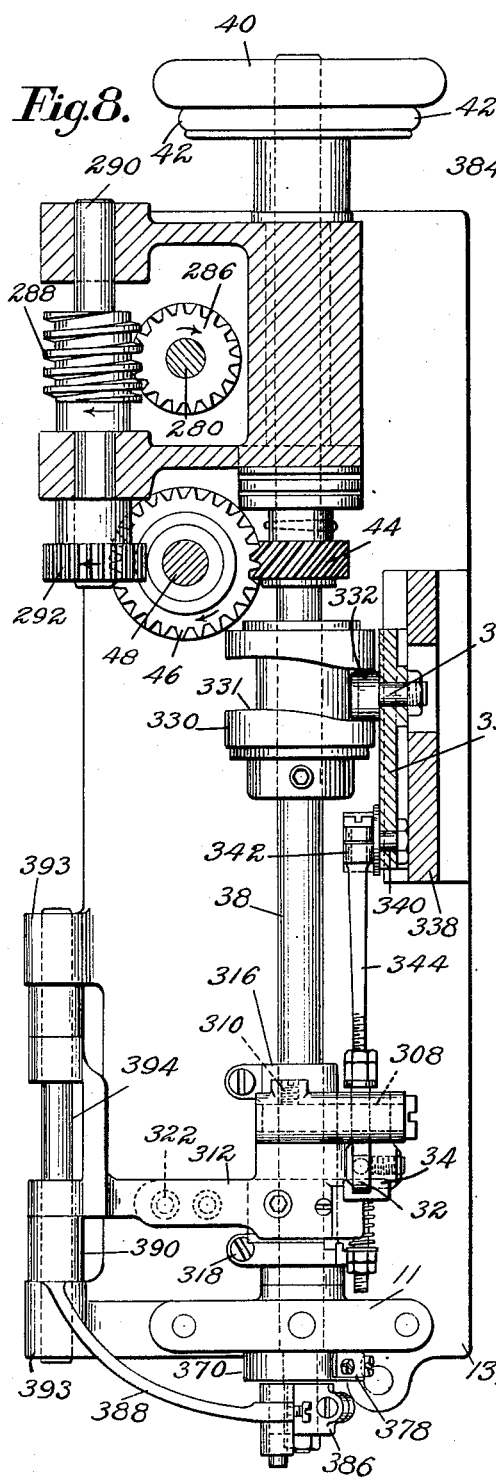
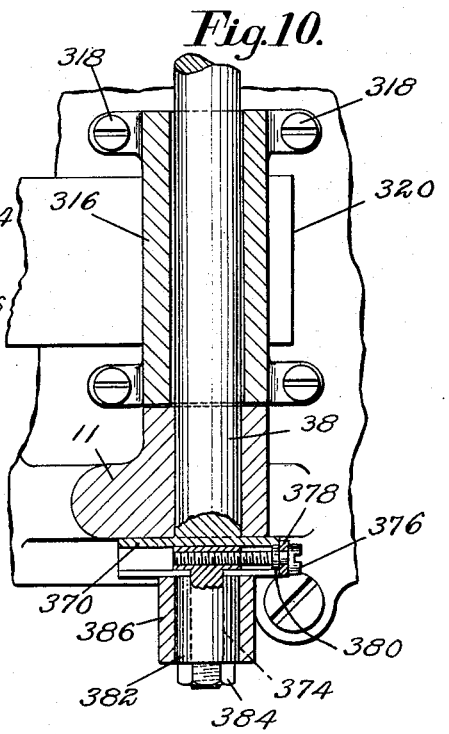
Inventor
Milton H Roske
By his Attorney Oct. 24, 1950    M. H. ROSKE    2,526,691
MACHINE FOR AND METHOD OF FOLDING
Filed Sept. 7, 1949    8 Sheets-Sheet 7
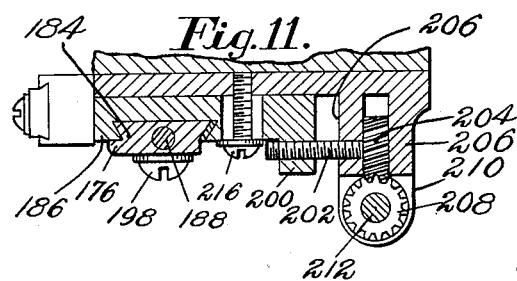
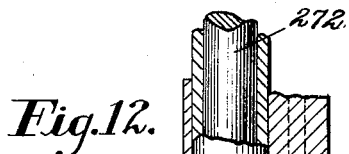
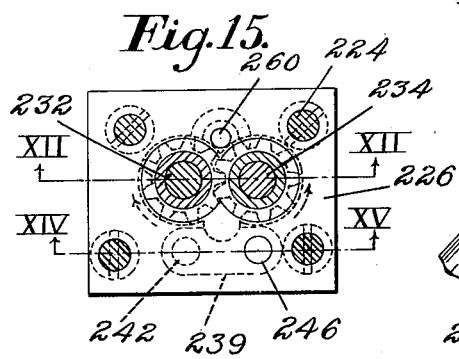
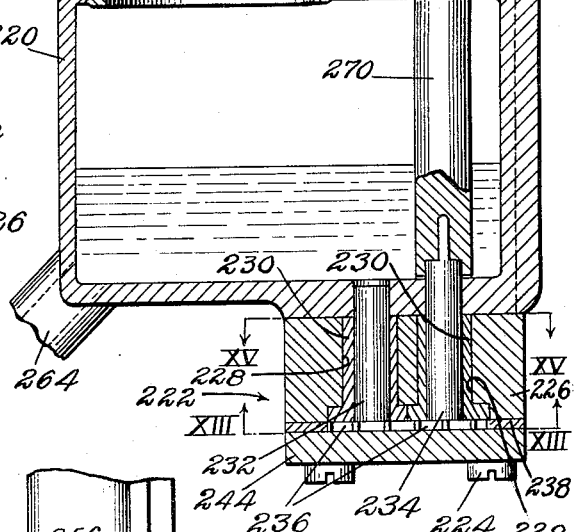
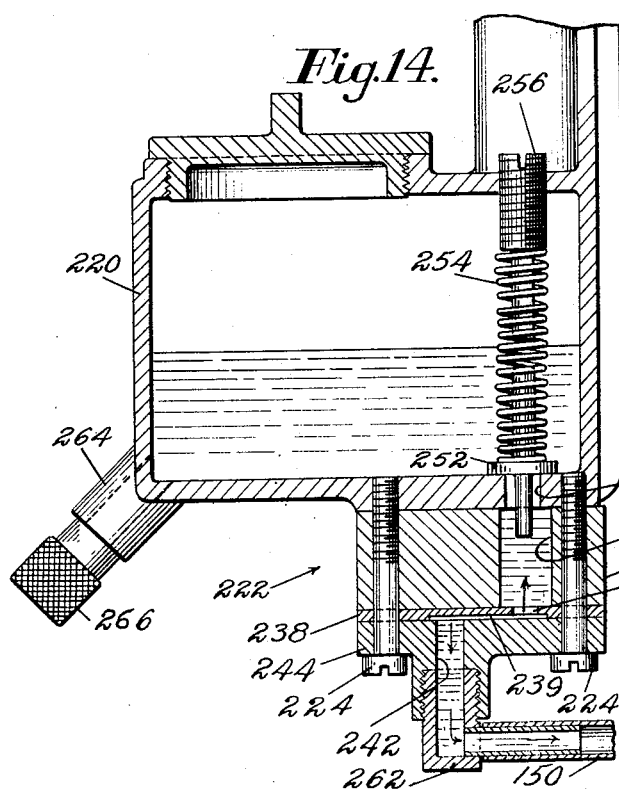
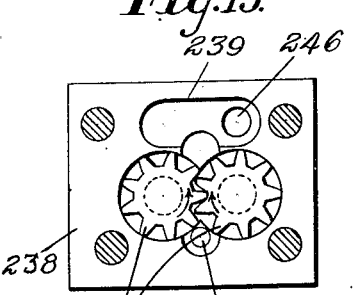
Inventor.
Milton H. Roske
By his Attorney Oct. 24, 1950 M. H. ROSKE 2,526,691
MACHINE FOR AND METHOD OF FOLDING
Filed Sept. 7, 1949 8 Sheets-Sheet 8
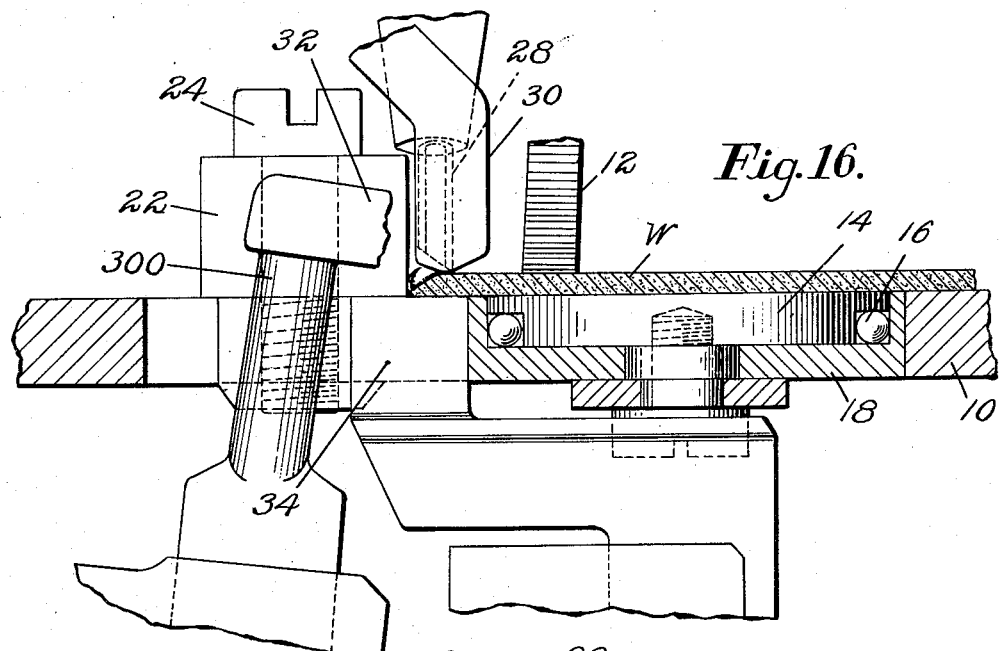
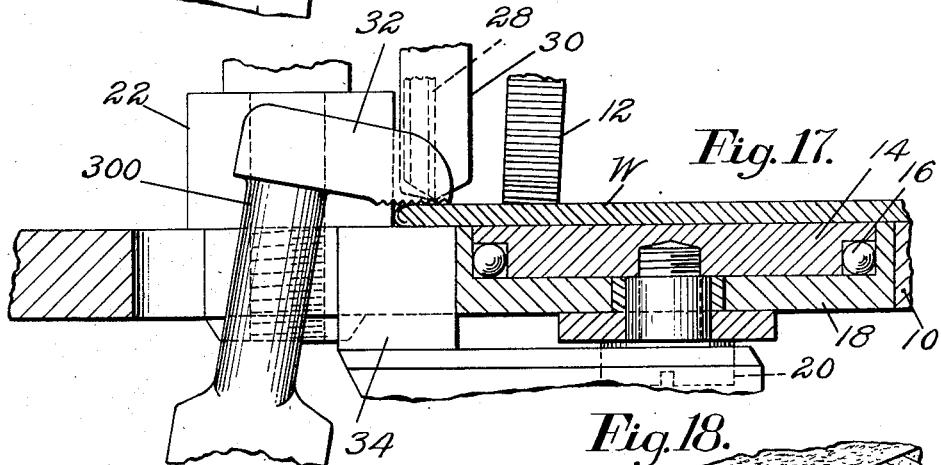
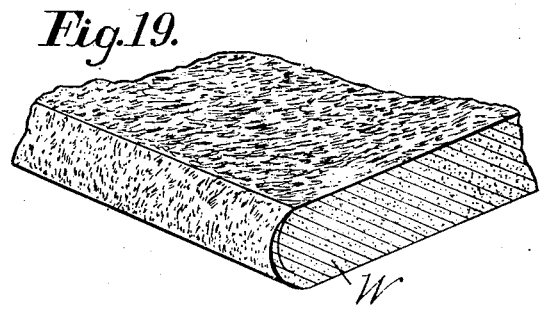
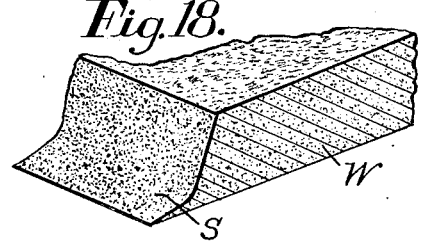
Inventor
Milton H. Roske
By his Attorney Patented Oct. 24, 1950

2,526,691

UNITED STATES PATENT OFFICE 2,526,691

MACHINE FOR AND METHOD OF FOLDING

Milton H. Roske, Malden, Mass., assignor to United Shoe Machinery Corporation, Flemington, N. J., a corporation of New Jersey Application September 7, 1949, Serial No. 114,359

12 Claims. (Cl. 12—51)

This invention relates to the folding of the margins of work pieces and more particularly to the folding of the skived margins of thin leather work pieces to form a narrow edge fold.

It is an object of the present invention to provide an improved machine for and method of folding in which the margin of the work is progressively coated with cement and immediately following the coating thereof the margin of the work is pressed against the body thereof.

To this end, and in accordance with a feature of the invention, a leather work piece is continuously fed over a work table and the margin thereof is turned up and coated with a solvent type cement, immediately following which the coated margin passes below and in contact with a heated iron which renders the cement tacky, as by driving the solvent out of the cement and which may also shrink the leather to cause the skived margin to curl toward the body of the work, the upturned margin then being pressed back upon the body of the leather by a cooperating hammer and anvil.

The work is fed over the work table by a continuously running feed wheel engageable with the upper surface of the work and in order not to oppose the continuous action of the feed wheel, and in accordance with a further feature of the invention, the hammer and anvil are moved together in the direction of feed of the work during the pressing action of the hammer.

The nozzle through which cement is applied to the margin of the work is, of necessity, mounted closely adjacent to the heated iron. In order to maintain the cement cool until it reaches the work and to prevent volatilization of the solvent therein, provision is made in accordance with a still further feature of the invention for circulating cool air around the nozzle.

The above and other features of the invention, including various details of construction and novel combinations of parts, will now be described with reference to the drawings and pointed out in the claims.

In the drawings,

Fig. 1 is a front elevation of one form of machine in which the invention is embodied;

Fig. 2 is a vertical section through the nozzle by which cement is applied to the margin of the work;

Fig. 3 is a front elevation partly in section of the operating parts of the machine, this section being taken on a larger scale than Fig. 1;

Fig. 4 is a plan view of the feed wheel and the associated work-engaging parts of Fig. 3;

Fig. 5 is a rear elevation of the machine;

Fig. 8 is a plan view, partly in section, of the drive mechanism in the base of the machine;

Fig. 9 is a section through the end of the drive shaft;

Fig. 10 is a section through the end of the drive shaft taken at right angles to the section of Fig. 9;

Fig. 11 is a section on the line XI—XI of Fig. 1;

Fig. 12 is a vertical section through the cement pot illustrating the pump by which cement is fed to the applying nozzle, this section being taken on the line XII—XII of Fig. 15;

Fig. 13 is a section on the line XIII—XIII of Fig. 12;

Fig. 14 is a section on the line XIV—XIV of Fig. 15;

Fig. 15 is a section on the line XV—XV of Fig. 12;

Fig. 16 is a vertical section on a large scale illustrating the action of the searing iron on the work;

Fig. 17 is a view similar to Fig. 16 illustrating the action of the hammer in pressing the folded margin of the work;

Fig. 18 is a view on a large scale of a portion of a work piece prior to being folded; and Fig. 19 is a view of the same work piece after the margin has been folded.

Figure 6:
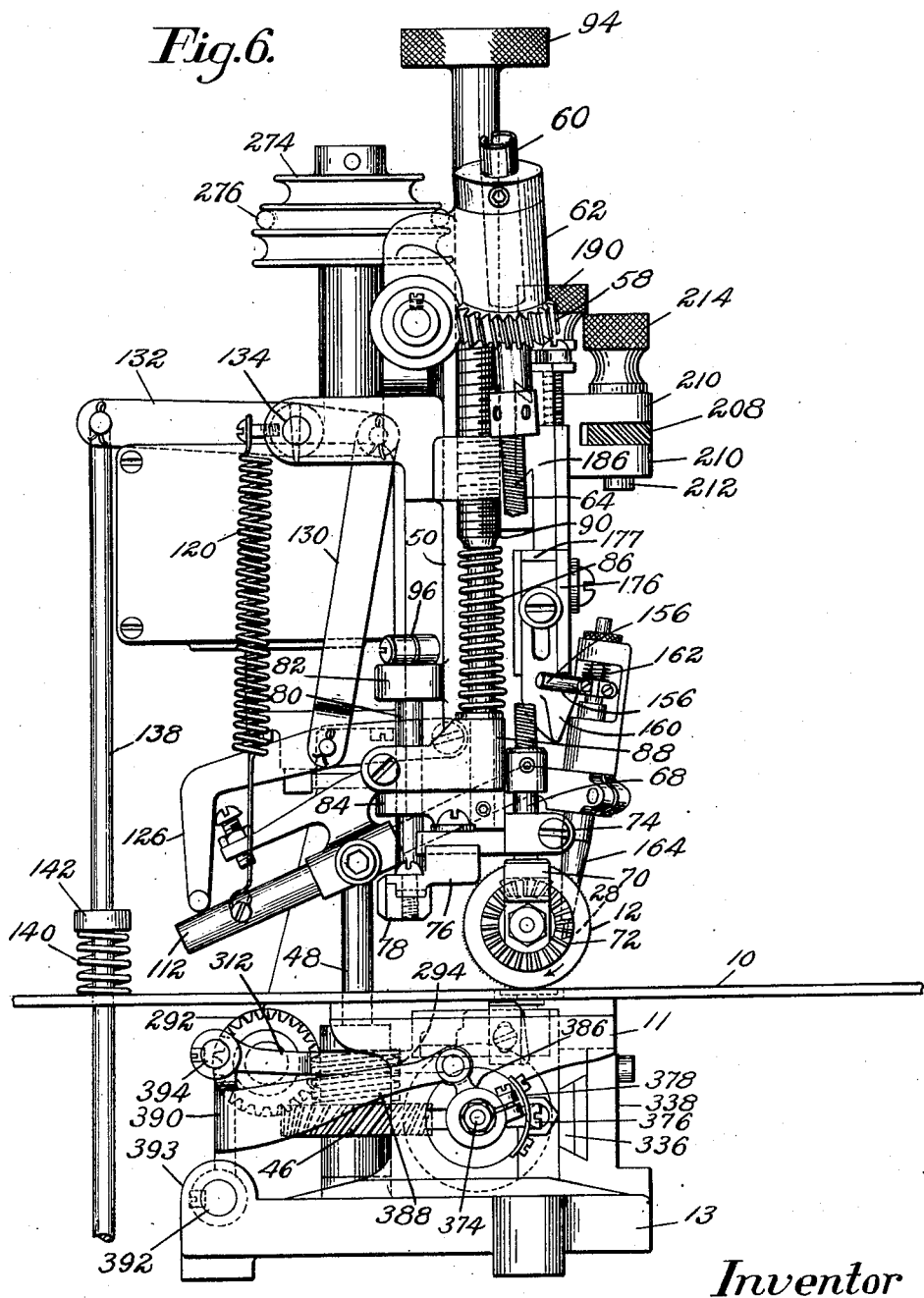
Fig. 6 is an end elevation of the machine.

The machine has a work table 10 carried at one end by a post 11 rising from a base 13. A work piece is fed over the table by a constantly rotating feed wheel 12 (Figs. 3, 4 and 6) having a knurled work engaging periphery. Journaled in the work table 10 below the feed wheel 12 is a roll 14 (Figs. 3, 16 and 17) supported by antifriction bearings 16 for free rotation to facilitate movement of the work by the feed roll 12 over the work table 10. The roll 14 is carried by a holder 18 between which and the flanged periphery of the roll the balls 16 are confined. A screw 20 maintains the parts in assembled relation.

Carried by the work table is a turning post or plow 22 secured by a screw 24 to the top surface of the work table in position to be engaged by the skived marginal portion S of a work piece W. The work engaging surface of the plow 22 at the end which is first engaged by the work is curved to turn the marginal portion of the work upwardly as indicated in Fig. 3 as the work is fed by the feed wheel 12. Mounted near the plow 22 and located to direct cement to the marginal portion of the work is a nozzle 28 (Figs. 1, 2, 4 and 7). Immediately beyond the nozzle 28 in the direction of movement of the work is an electrically heated iron 30 (Figs. 1, 4, 7, 16 and 17) the function of which is to shrink the work in a manner similar to that of edging machines but to a lesser extent and also to drive the solvent out of the cement so that it becomes very tacky, ready to adhere as soon as the skived margin S is curled up and is subjected to the pressing of the folded margin by a hammer 32 which cooperates with an anvil 34 located below the work table 10. The hammer and anvil are moved in unison in the direction of feed of the work at the completion of a pressing stroke of the hammer after which the hammer is raised and the parts moved back to their initial positions, by mechanism to be described.

Mechanism for driving the feed wheel 12 will now be described. Journaled in the base 13 of the machine is a drive shaft 38 (Figs. 1 and 8) to the right end of which is secured a pulley 40 to receive a belt 42 by which the shaft is connected to any suitable source of power. The drive shaft 38 carries a skew gear 44 which meshes with a similar gear 46 on a vertical shaft 48, the lower end of which is journaled in the base of the machine and the upper end of which is journaled in an overhanging arm 50. The upper end of the shaft 48 is connected by skew gears 52 to a horizontal shaft 54 journaled in bearings carried by the arm 50 the outer end of the shaft carrying a worm 56 meshing with a worm gear 58 carried by an inclined shaft 60 journaled in a bracket 62 carried by the shaft 54 adjacent to the worm 56. The shaft 60 is connected by a flexible shaft 64 to a shaft 65 (Fig. 3) carrying beveled gear 66, the shaft 65 being journaled in a sleeve 68 adjustably secured to a rod 80 which is slidable vertically on the arm 50 as will be described. The sleeve 68 carries a bracket 70 in which is journaled a beveled gear 72 meshing with the gear 66, the gear 72 carrying the feed wheel 12. Thus, it will be apparent that during rotation of the shaft 38 the feed wheel 12 is rotated at a relatively slow rate through the reduction gearing heretofore described.

The flexible shaft 64 facilitates adjustment of the feed wheel 12 from front to back and sideways to bring it into exactly the desired relation to the other operating tools and also allows lifting of the feed wheel out of contact with the work when desired, by means to be described. For the horizontal adjustments, there is secured to the sleeve 68 above the wheel carrying bracket 70 a rearwardly extending arm 74 (Fig. 6) to the rearward portion of which is adjustably secured, for front to back positioning, a block 76. Adjustably connected to this block for lateral positioning is an arm 78 clamped to the lower end of the rod 80.

To compensate for variations in the thickness of the work and to permit lifting of the wheel when inserting a piece of work, this wheel-carrying rod is carried for vertical sliding movement by bearing blocks 82, 84 integral with the lower end of the overhanging arm 50. The feed wheel 12 is yieldingly held in its lowermost or feeding position by a stiff compression spring 86, the lower end of which is in engagement with an arm 88 clamped to the rod 80 and engageable with the bearing block 84 to determine the lowermost position of the feed wheel. The compression spring 86 surrounds the reduced end of a screw 90 and at its top it abuts a shoulder thereon. The screw 90 is threaded through a bracket 92 (Fig. 1) on the overhanging arm 50 and provided at its upper end with a knurled handle 94 to facilitate adjustment of the compression of the spring 86.

It may be desirable at times to lift the feed wheel 12 out of operative position and for this purpose finger mechanism best shown in Fig. 5 is provided. Clamped to the upper end of the rod 80 above the bearing 82 is an arm 96 extending laterally from which is a pin 98 engageable with an arm 100 of a lever 102 pivotally carried by a pin 104 which is in turn carried by the overhanging arm 50. The lever 102 has a second arm 106 which terminates in a horizontal finger piece 107 whereby it may be operated to raise the arm 100 thereby to lift the rod 80 and the feed wheel 12.

Figure 7:
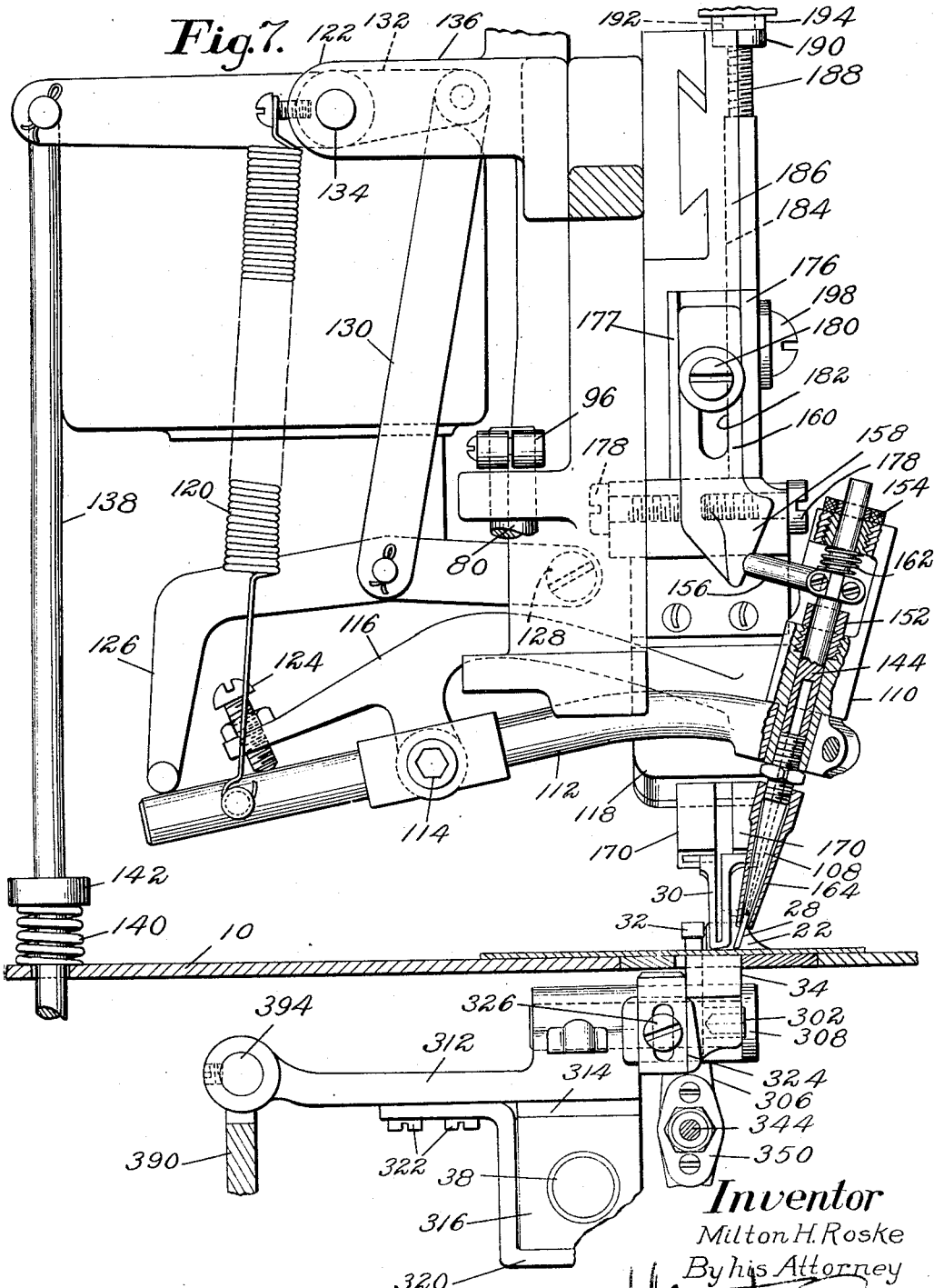
Fig. 7 is an end elevation, partly in section, with certain parts removed to illustrate other parts.

The nozzle 28 by which cement is delivered to the margin of the work is best illustrated in Figs. 2 and 7 from which it will be seen that it is normally raised above the work but can be lowered into operative position at the will of the operator. This nozzle is formed at the lower end of a tube 108, the upper end of which is threaded into a block 110 which is in turn clamped on the rear end of a swinging arm 112 pivoted at 114 to an arm 116 rigidly carried by a holder 118 for the iron 30. The outer end of the arm 112 is connected by a tension spring 120 to a bracket 122 on the overhanging arm, said spring urging the nozzle 28 downwardly into a position determined by a screw 124 threaded through the arm 116 and engageable with the arm 112 carrying the block 110.

It is desirable, however, when the machine is idle, to have the nozzle raised above the table. Hence, engageable with an end of the nozzle carrying arm 112 is a lever 126 pivoted at 128 to the frame of the machine and connected by a link 130 to one end of a lever 132. This lever is pivoted at 134 to a bracket 136 carried by the overhanging arm 50, the other end of the lever 132 having connected to it a downwardly extending rod 138, the lower end of which is connected to a treadle (not shown). The rod 138 is normally urged upwardly by a spring 140 acting between the table 10 and a collar 142 secured to the rod 138. The spring 140 normally urges the rod 138 upwardly so that a downward force is exerted by the lever 126 on the adjacent end of the arm 112 which will lift the nozzle 28 out of operative relation to the work into the position shown in Fig. 1, the spring 140 being strong enough to overcome the action of the spring 120 which tends to hold the nozzle in its operative position. Upon depression of the treadle the rod 138 is moved downwardly against the action of the spring 140, moving the lever 126 upwardly and permitting downward movement of the nozzle under the action of the spring 120.

Rotatable in the block 110 is a valve member 144 having a bore 146 extending part way through and communicating with the passageway through the nozzle 28. The upper end of the bore 146 terminates in a port which is in communication with a passageway 148 extending laterally in the block 110 and communicating with a pipe 150 through which cement is delivered. With the valve member 144 in the position shown in Fig. 2 cement is permitted to flow downwardly through the valve member and nozzle to the work, but upon rotation of the valve member the port therein moves out of communication with the passageway 148 thus interrupting the flow of cement from the pipe 150 to the nozzle 28. The upper end of the valve member 144 passes through bushings 152, 154 threaded into the block, as shown in Fig. 2, the block being cut away to expose the upper end of the valve member.

Secured to the upper end of the valve member and extending laterally therefrom as shown in Fig. 7 is an arm 156 arranged for engagement with the cam surface 158 of a plate 160 adjustably carried by the machine in a manner to be described. A torsion spring 162 surrounds the upper end of the valve member and is connected to it and to the block 110 in such a manner that the pin 156 is maintained in engagement with the cam surface 158. The cam surface is so shaped that upon upward movement of the nozzle it acts by its engagement with the pin 156 to rotate the valve member into a position in which the flow of cement to the nozzle is interrupted. Thus each time that the nozzle is raised the flow of cement therethrough is automatically cut off.

By reason of the presence of the searing tool or iron 30 in proximity to the lower end of the nozzle 28 it is desirable to cool the nozzle to prevent premature volatilization of the solvent in the cement or bubbling of the cement which might impair its effectiveness in securing the folded margin in position. Accordingly, a tube 164 is secured to the threaded upper end of the nozzle and extends downwardly around the nozzle but is spaced slightly therefrom. Cooling air is delivered to this space by a tube 166 (Fig. 1), the flow of air therethrough being controlled by a valve 168.

The iron 30 by which the leather is shrunk near the edge and by which drying of the cement is hastened consists of a U-shaped piece of metal of a suitable alloy such as nichrome so that when an electric current is passed through it will attain the desired temperature. The legs of the iron are carried by suitable conductors 170 which are carried by and extend downwardly from the holder 118, the conductors being suitably insulated from each other in the holder. The conductors 170 are in turn connected by insulated wires 172 (Fig. 1) to a source of electric current so that when a switch (not shown) is turned on the iron 30 will rapidly heat up to the desired temperature.

The position of the iron 30 with respect to the plow 22 and the other portions of the machine can be varied heightwise, in the direction of the travel of the work and transversely of the direction of travel of the work. The holder 118 has secured thereto a dovetailed shaped member 174 recessed in a correspondingly shaped groove in the lower end of a block 176. The opposite ends of the dovetailed shaped portion 174 are engaged by the heads of screws 178 threaded into opposite sides of the block thus determining the position of the holder 118 lengthwise of the direction of the travel of the work through the machine. The block 176 has, on its left side, an inturned flange 177 which provides a support for the nozzle-closing cam plate 160 which is adjustably secured in a recess in the block by a screw 180 passing through a slot 182 (Fig. 7) in the plate. The block 176 has a dovetailed portion 184 (Fig. 11) recessed in a correspondingly shaped vertical slot in a plate 186. Threaded into the upper end of the block 176 is a screw 188 (Fig. 1) the upper end of which is provided with a knob 190 by which the screw is turned to adjust the heightwise position of the block. The knob 190 has formed in its lower portion a peripheral groove 192 engaged by a plate 194 secured to the plate 186 to prevent heightwise movement of the screw 188. In order to lock the block 176 in its heightwise position it is provided with a slot 196 through which passes a screw 198 threaded into the plate 186.

Horizontal adjustment of the shrinking iron is permitted by mounting the plate in a groove in the face of the arm 50 and at its right end, the plate 186 is provided with an ear 200 (Fig. 11) into which is threaded a screw 202 the right end of which has secured thereto a skew gear 204 (Fig. 11) confined against axial movement by forwardly extending wall members 206 of the frame of the machine. In mesh with the skew gear 204 is a second skew gear 208 positioned between vertically spaced ears 210 (Fig. 1) of the frame of the machine and secured to a vertical shaft 212, the upper end of which is provided with an adjusting knob 214. It will be apparent that upon turning the knob 214 the screw 202 is turned to move the plate 186 transversely of the path of movement of work through the machine. A locking screw 216 passes through a slot in the plate 186 and is threaded into the frame of the machine to secure the plate in adjusted position.

For supplying cement to the nozzle 28 a cement pot 220 (Figs. 12 and 14) is carried by the overhanging arm 50 (Fig. 5). Clamped to the underside of the pot by screws 224 is a pump mechanism 222. This pump mechanism includes a block 226 provided with vertical bores 228 into which are fitted bearing sleeves 230 for stub shafts 232, 234, the lower ends of which carry gear members 236. These gear members are partially surrounded by a plate 238, the thickness of which is substantially the same as the thickness of the gear members, this plate being recessed at 239 (Fig. 13) thus providing communication with an outlet bore 242 in a fitting 244 forming the lower portion of the assembly constituting the pump unit.

The plate 238 has, opening from this recess, a by-pass port 246 which communicates with a bore 248 in the block 226 and with a port 250 in the bottom of the cement pot 220. The port 250 normally is closed by a valve 252 urged downwardly by a spring 254, the force exerted thereby being controlled by an adjusting screw 256 threaded through the top wall of the cement pot. The recess 239 also provides communication between the port 246 and the pump members 236. The inlet to the pump members is located at the opposite side from the port 246 and is indicated at 260 (Fig. 15). Threaded into the fitting 244 is a nipple 262 providing communication between the bore 242 and the hose 150 by which cement is delivered to the nozzle. The pot 220 is provided with a drain 264 normally closed by a plug 266.

Upon rotation of the pump members cement is delivered from the pot 220 to the ports 242, 246. If the nozzle is in its operative position providing a free flow of cement therethrough, the cement will flow through the port 242 and the hose 150, the pressure in the hose being limited by the by-pass spring 254 so that if the pressure exceeds a predetermined amount the cement will flow through the port 246 past the valve 252 back into the pot 220. If the nozzle is lifted to close the passage therethrough the cement will merely be recirculated through the pump and back into the pot 220 by way of the port 250.

The upper end of the pump shaft 234 (Fig. 12) is connected to a vertically extending shaft 270 passing through the top wall of the pot 220 and having a splined connection with a shaft 272, the upper end of which carries a pulley 274 (Fig. 1) connected by a belt 276 with a pulley 278 on a vertical shaft 280. The shaft 280 is journaled in bearing members 282, 284 (Fig. 5) carried by the vertical portion of the overhanging arm 50, the shaft carrying at its lower end a worm gear 286 (Fig. 8) which meshes with a worm 288 carried by a horiontal shaft 290 journaled in the base of the machine. The shaft 290 carries a worm gear 292 engageable with a worm 294 (Fig. 5) secured to the lower end of shaft 48 which is driven by the shaft 38 as has been described. Thus it will be seen that simultaneously with the rotation of the feed wheel 12 the gears 236 (Fig. 13) of the gear pump will be turned at a slow speed which will be in proportion to the speed of the feed wheel 12 to deliver cement to the nozzle 28 at the proper rate.

The hammer 32, by which the cemented and turned up margin of the work is pressed against the body of the work immediately after the action of the iron 30, has a depending stem 300 (Fig. 3) which is adjustably secured by a screw 302 to one end of an arm 304 of a bell crank lever 306 carried by a pivot pin 308 so that the hammer can be oscillated by mechanism to be described, about the axis of the pin 308 toward and from the work. The pin 308 is secured by a set screw 310 (Fig. 8) to a slide block 312 which is arranged to be oscillated in directions parallel to the path of feed of the work by mechanism to be described. The slide block 312 slides on a wear plate 314 (Fig. 7) secured to the top of a bearing block 316 through which the drive shaft 38 passes, the bearing block being secured by screws 318 (Fig. 10) to the base of the machine. As shown in Figs. 1 and 9, the bearing block 316 is spaced above the base of the machine to provide space to receive a strap 320 (Fig. 7) engageable with the other surface of the bearing block, one end of this strap being secured by screws 322 to the slide block 312. The anvil 34 has a depending stem portion 324 which is slotted to receive a screw 326 by which it is secured for vertical adjustment to the slide block 312.

For oscillating the hammer toward and from the work the drive shaft 38 carries a cam 330 (Fig. 8) having a peripheral cam groove 331 which receives a cam roll 332 rotatable on a pin 334 secured to a slide 336. This slide is movable in a slideway formed in a block 338 suitably secured to the base of the machine. At the left end of the slide, as viewed in Fig. 8, is a pin 340, the outer end of which is provided with a spherical head to form a ball-and-socket joint 342 with the adjacent end of a rod 344. Near its other end, the rod 344 carries a ball member 346 (Fig. 3) which is received in a correspondingly shaped recess formed in a depending arm 348 of the bell crank lever 306 and a plate 350 secured by screws 352 to the arm 348. The rod 344 is slideable with respect to the ball member 346 and accordingly with respect to the arm 348 of the bell crank lever 306.

Carried by the rod 344 and engageable with the outer sides of the arm 348 and the plate 350 are abutment members 354 and 356 respectively. The abutment member 354 is normally maintained in engagement with the arm 348 by nuts 358 threaded on the rod 344, whereas the abutment member 356 is held by a spring 360 in engagement with the plate 350, the outer end of the spring being engaged by a nut 362 threaded on the outer end of the rod 344 and held in place by a lock nut 364. Upon rotation of the shaft 38 (Fig. 8) the slide 336 is moved to the right by the cam 330 to move the bell crank lever 306 (Fig. 3) in a counterclockwise direction, whereupon the hammer 32 is moved downwardly into engagement with the marginal portion of the work. The movement of the bell crank lever by the rod 344 is effected by the spring 360 which permits relative movement of the rod and the bell crank lever after the hammer has pressed the folded margin of the work. Thus, the spring 360 permits yielding of the parts and exertion of a substantially uniform pressure by the hammer to the work regardless of the thickness of the work.

As soon as the hammer engages the margin of the work the hammer and anvil are moved in the direction of feed so that they assist the feed roll 12 in advancing the work over the work table rather than opposing it as would be the case if the hammer and anvil did not have this feed movement but clamped the work momentarily in position on the work table. The outer end of the shaft 38 (Figs. 9 and 10) has formed thereon or secured thereto an enlarged portion 370 in which is formed a T-shaped slot 372 which slideably receives the headed end of a stub shaft 374. The head of the stub shaft 374 is threaded to receive a screw 376, the head of which bears against a band 378 secured to the enlarged portion 370 of the shaft 38. The screw 376 carries a collar 380 engageable with the inner surface of the band 378 so that in cooperation with the head of the screw it prevents axial movement of the screw, whereupon rotation of the screw will move the stub shaft 374 transversely of the shaft 38 to adjust the eccentricity of the stub shaft with respect to the drive shaft 38.

The stub shaft 374 carries a bushing 382 held in position by a nut 384 threaded on the outer end of the stub shaft. An eccentric strap 386 surrounds the bushing 382 and has connected to it an arm 388 (Figs. 6 and 8), the outer end of this arm being integral with a vertical plate 390 pivoted on a shaft 392 in lugs 393 on the base 13 of the machine. The upper end of the plate 390 carries a shaft 394 on which the outer end of the slide block 312 is pivoted. Consequently, upon rotation of the drive shaft 38 the slide block is oscillated in directions parallel to the path of feed of the work, the extent of oscillation depending upon the amount of eccentricity of the stub shaft 374 with respect to the drive shaft. Inasmuch as the hammer and anvil are carried by the slide block 312, as heretofore explained, they will move as a unit in the direction of feed of the work and the cam 330 (Fig. 8) is so positioned on the shaft 38 that this movement of the hammer and anvil will take place simultaneously with the engagement of the work by the hammer. During movement of the hammer out of engagement with the work the hammer and anvil are returned by reverse movement of the slide block 312 into the positions illustrated in Fig. 7.

In the operation of the machine the nozzle 28 is lifted by the treadle-rod-spring 140 (Fig. 6) to permit introduction of the work into the machine. This lifting of the nozzle by release of pressure on the treadle also closes the valve to prevent cement being delivered to the nozzle. If desired, the feed wheel 12 may also be lifted by actuation of the lever 102 (Fig. 5). After the work has been properly positioned in the machine for the start of a folding operation the drive wheel 12 is permitted to engage the work and the treadle is depressed so that the nozzle 28 is moved by the spring 120 (Fig. 7) into engagement with the work and this movement of the nozzle permits opening of the valve therein by the spring 162 so that the pump delivers cement through the nozzle located to deliver it directly onto the skived margin of the work. This margin is then turned upwardly by the turning post 22 as the work is continually fed by the feed wheel 12, and immediately after the cement is applied to a given portion of the work it is acted upon by the heated iron 30 which expels the solvent from the cement and also tends to shrink the leather so that the upturned margin curls back toward the body of the work. This upturned margin is then pressed by the hammer 32 against the anvil 34, the hammer and anvil moving in the direction of feed of the work during this pressing operation and then returning to press another portion of the work immediately adjacent to that which has just been pressed.

In Figs. 18 and 19 are shown sections through a skived piece W of leather on a greatly enlarged scale. Fig. 18 shows the appearance of the work prior to being acted upon by the machine. As the work is fed through the machine the scarf S is turned upwardly by the turning post 22. Cement is applied thereto as it is being turned up and it is acted upon by the heated iron 30 and then the turned up portion is pressed down upon the body of the work, the appearance of the work after being folded being shown in Fig. 19. It has been found that the leather is compressed particularly at the base of the skived portion so that the work, as viewed under a microscope, has the appearance shown in Fig. 19. The skiving may be performed by a machine of the type shown and described in application, Serial No. 114,635, filed September 8, 1949, in my name. With such a machine the length of the scarf will be the same regardless of the thickness of the work and thus it will be apparent that with work of less thickness, with respect to the length of the scarf, than that shown in Fig. 18, the scarf may overlap the top surface of the work at the completion of the folding operation, whereas in the case of a thicker work piece the scarf may not quite approach the top surface. My machine is particularly adapted for the folding of margins of thin work pieces and the variations in appearance for different thicknesses of the work are hardly discernible with the naked eye.

Having thus described the invention what I claim as new and desire to secure by Letters Patent of the United States is:

1. In a machine for folding the skived margins of leather work pieces, means for progressively delivering cement to the margin to be folded, means for simultaneously applying shrinking heat to the margin of the leather, and means for pressing the upturned cemented margin of the leather back upon the body of the leather.

2. In a machine for folding the skived margins of leather work pieces, a work support, means for feeding a work piece over the work support, a plow engageable with the margin of the work for turning the margin upwardly, a heated shrinking tool positioned for engagement with the work adjacent to said plow, a device for delivering cement to the margin in advance of said shrinking tool, and means for pressing the upturned margin of the work back upon the body of the work after the engagement of the work with the shrinking tool.

3. In a machine for folding the skived margins of leather work pieces, a work support, means for feeding a work piece over the work support, a plow engageable with the margin of the work for turning the margin upwardly, a heated tool positioned for engagement with the work adjacent to said plow, a nozzle for delivering cement to the margin immediately in advance of said tool, means for pressing the upturned margin of the work back upon the body of the work immediately after engagement of the work with the tool, and means for supplying a cooling medium to said nozzle to prevent overheating of the cement as it is applied to the work.

4. In a machine for finishing the margins of work pieces, a work support, a continuously driven feed roll engageable with the upper surface of the work for feeding it over the work support, a plow with which the margin of the work is engaged in its feeding movements, said plow having a surface for turning up the margin of the work, a heated shrinking tool adjacent to said plow engageable with the margin of the work, a hammer movable toward and from the work for pressing the upturned margin down upon the body of the work, an anvil arranged to sustain the work for action of the hammer, and means for moving the hammer and anvil as a unit in the direction of feed during engagement of the work by the hammer.

5. In a machine for finishing the margins of leather work pieces, a work support, a continuously driven feed roll engageable with the upper surface of the work for feeding it over the work support, a plow with which the margin of the work is engaged in its feeding movement, said plow having a surface for turning up the margin of the work, a heated iron adjacent to said plow engageable with the upturned margin of the work, a nozzle for applying cement to the margin of the work, said nozzle being located immediately in advance of said iron, a hammer movable toward and from the work for pressing the upturned margin down upon the body of the work, an anvil arranged to sustain the work for the action of the hammer, and means for causing the hammer and anvil to move as a unit in the direction of feed during engagement of the work by the hammer.

6. In a folding machine, a work support, means for feeding a work piece over the support, a nozzle for applying a solvent type cement to the margin of the work, means for driving the solvent from the cement after it has been applied to the work, and means for then folding the margin of the work.

7. In a folding machine, a work support, means for feeding a work piece over the support, a nozzle for applying a solvent type cement to the margin of the work, a heating iron adjacent to said nozzle for driving the solvent from the cement immediately after the cement is applied to the work, and means for immediately thereafter folding the margin of the work.

8. In a folding machine, a work support, means for feeding a work piece over the support, a nozzle for applying a solvent type cement to the margin of the work, a heating iron adjacent to said nozzle for driving the solvent from the work after it is applied thereto, means for cooling the nozzle to prevent premature volatilization of the solvent from the cement, and means for folding the margin of the work.

9. In a folding machine, a work support, means for feeding a work piece over the support, a nozzle for applying a solvent type cement to the margin of the work, means forming a passage around said nozzle for cooling air, means for conducting cooling air to said passage whereby the cement is maintained cool until it is applied to the work, means for heating the cement after its application to the work to drive the solvent therefrom, and means for folding the margin of the work.

10. The method of folding the skived margins of leather work pieces which comprises progressively applying a solvent type of cement along the skived margin, driving the solvent from the cement immediately after application of the cement to the work, and immediately thereafter folding the skived margin and pressing the fold.

11. The method of folding the skived margins of leather work pieces which comprises progressively bending the margin of the work upwardly, simultaneously applying a solvent type of cement to the bent-up portion of the work, heating the cement to evaporate the solvent, and then pressing the bent-up portion down upon the body of the work.

12. The method of folding the skived margins of leather work pieces which comprises bending the margin of the work upwardly, simultaneously applying a solvent type of cement to the bent-up portion of the work, applying heat to shrink the leather and to drive the solvent therefrom, and immediately thereafter pressing the bent-up portion down upon the body of the work.

MILTON H. ROSKE.

No references cited.